United States Patent
Jons

(10) Patent No.: US 9,840,426 B2
(45) Date of Patent: Dec. 12, 2017

(54) WATER TREATMENT ASSEMBLY INCLUDING HYPERFILTRATION MODULE AND PRESSURIZABLE RESERVOIR

(71) Applicant: Dow Global Technologies LLC, Midland, MI (US)

(72) Inventor: Steven D. Jons, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 224 days.

(21) Appl. No.: 14/773,808

(22) PCT Filed: Apr. 16, 2014

(86) PCT No.: PCT/US2014/034260
§ 371 (c)(1),
(2) Date: Sep. 9, 2015

(87) PCT Pub. No.: WO2014/176082
PCT Pub. Date: Oct. 30, 2014

(65) Prior Publication Data
US 2016/0031725 A1    Feb. 4, 2016

Related U.S. Application Data

(60) Provisional application No. 61/816,184, filed on Apr. 26, 2013.

(51) Int. Cl.
*B01D 61/02* (2006.01)
*B01D 63/10* (2006.01)
(Continued)

(52) U.S. Cl.
CPC .............. *C02F 1/44* (2013.01); *B01D 61/02* (2013.01); *B01D 61/025* (2013.01); *B01D 61/04* (2013.01);
(Continued)

(58) Field of Classification Search
CPC ............ B01D 2311/04; B01D 2311/12; B01D 2311/25; B01D 2311/02; B01D 2313/19;
(Continued)

(56) References Cited

U.S. PATENT DOCUMENTS

| 4,711,723 A | 12/1987 | Bray |
|---|---|---|
| 4,713,175 A | 12/1987 | Bray |

(Continued)

FOREIGN PATENT DOCUMENTS

| CA | 2186963 | 4/1998 |
|---|---|---|
| CN | 2839254 Y | 11/2006 |

(Continued)

*Primary Examiner* — Pranav N Patel
(74) *Attorney, Agent, or Firm* — Edward W. Black

(57) ABSTRACT

A water treatment assembly comprising a spiral wound hyperfiltration membrane module connected to: i) a feed line adapted for connection to a source of pressurized feed water, ii) a permeate line adapted for connection to a dispenser of treated water and iii) a concentrate line adapted for connection with drain; wherein the assembly further includes a pressurizable reservoir with valves for selectively diverting flow of pressurized feed water along the feed line, through the reservoir and returning to the feed line prior to passing through the hyperfiltration membrane module.

7 Claims, 1 Drawing Sheet

(51) Int. Cl.
*C02F 1/44* (2006.01)
*B01D 61/04* (2006.01)
*B01D 61/12* (2006.01)
*B01D 65/06* (2006.01)

(52) U.S. Cl.
CPC ............ *B01D 61/12* (2013.01); *B01D 63/10* (2013.01); *B01D 65/06* (2013.01); *C02F 1/441* (2013.01); *B01D 2311/04* (2013.01); *B01D 2311/12* (2013.01); *B01D 2311/25* (2013.01); *B01D 2313/19* (2013.01); *B01D 2313/50* (2013.01); *C02F 2209/03* (2013.01); *C02F 2209/05* (2013.01)

(58) Field of Classification Search
CPC .. B01D 2313/50; B01D 61/02; B01D 61/025; B01D 61/04; B01D 61/12; B01D 61/08; B01D 63/10; C02F 1/44; C02F 1/441; C02F 9/005; C02F 2209/03; C02F 2209/05; C02F 2307/10
See application file for complete search history.

(56) References Cited

U.S. PATENT DOCUMENTS

| | | |
|---|---|---|
| 4,842,724 A | 6/1989 | Bray et al. |
| 5,296,148 A | 3/1994 | Colangelo et al. |
| 6,190,558 B1 | 2/2001 | Robbins |
| 6,582,595 B1 * | 6/2003 | Peabody ............... C02F 5/025 |
| | | 210/190 |
| 7,060,136 B1 | 6/2006 | Zeiher et al. |
| 7,267,769 B2 | 9/2007 | Baird |
| 7,698,928 B2 | 4/2010 | Jons et al. |
| 2002/0108906 A1 | 8/2002 | Husain et al. |
| 2008/0093283 A1 | 4/2008 | Ukon |
| 2011/0198275 A1 * | 8/2011 | Hayes ............... C02F 1/441 |
| | | 210/251 |

FOREIGN PATENT DOCUMENTS

| | | |
|---|---|---|
| WO | 20048943 | 8/2000 |
| WO | WO2013040420 | * 3/2013 |

* cited by examiner

WATER TREATMENT ASSEMBLY INCLUDING HYPERFILTRATION MODULE AND PRESSURIZABLE RESERVOIR

FIELD

The invention is directed toward water treatment assemblies including both a hyperfiltration (e.g. reverse osmosis) membrane module and a pressurizable reservoir with valves for selectively diverting flow of pressurized feed water through the reservoir at a location upstream from the module.

INTRODUCTION

"Hyperfiltration" is a membrane-based separation process where pressure is applied to a feed solution on one side of a semi-permeable membrane. The applied pressure causes "solvent" (e.g. water) to pass through the membrane (i.e. forming a "permeate: solution) while "solutes" (e.g. salts) are unable to pass through the membrane and are concentrated in the remaining feed (i.e. forming a "concentrate" solution). To overcome the natural driving force of solvent to move from low to high concentration, the applied feed pressure must exceed the osmotic pressure. For this reason, the term "hyperfiltration" is often used interchangeable with "reverse osmosis." Most water treatment assemblies utilizing hyperfiltration operate in cross-flow mode with the majority of feed passing across the surface of the membrane and a minority portion passing through the membrane as "permeate." See for example U.S. Pat. Nos. 4,711,723, 4,713,175, 4,842,724, 5,296,148, 7,267,769 and CN 2839254.

The percentage of feed solution passing through the membrane is referred to as the "recovery" or "recovery rate." Depending upon the composition of the feed, operating at higher recoveries can lead to scaling as the salts in the feed become concentrated above their solubility limit. Individual modules in large scale desalination systems are typically designed to run continuously with 10-20% recovery. By contrast, small reverse osmosis modules used in residential systems are usually infrequently operated, and these systems are commonly designed for recoveries between 20-35%. Significantly higher recoveries (e.g. above 35%) are frequently limited by scaling, as most un-softened residential waters contain significant amounts of calcium and bicarbonate ions. Increasing this concentration through high recovery operation can result in $CaCO_3$ scale.

SUMMARY

The invention includes a water treatment assembly including a spiral wound hyperfiltration membrane module connected to: i) a feed line adapted for connection to a source of pressurized feed water, ii) a permeate line adapted for connection to a dispenser of treated water and iii) a concentrate line adapted for connection with drain. The assembly is characterized by including a pressurizable reservoir including valves for selectively diverting flow of pressurized feed water along the feed line, through the reservoir and returning to the feed line prior to passing through the hyperfiltration membrane module. The reservoir includes an additive selected from: a cleaning agent (e.g. acetic acid to mitigate scaling) or a challenge species (e.g. to test the integrity of the membrane module). A variety of embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

Figure 1:
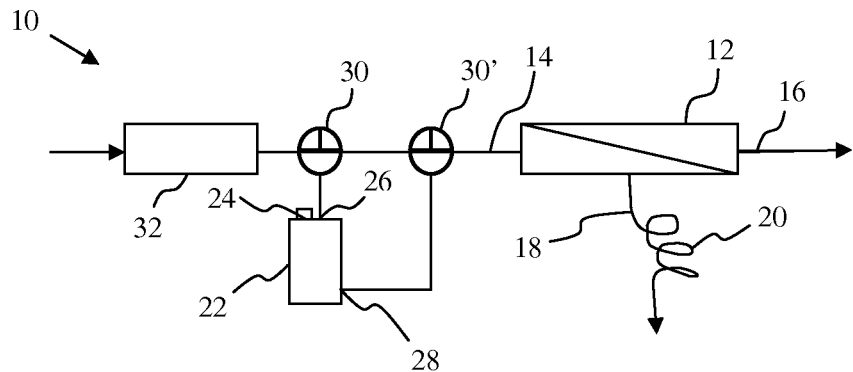
FIG. 1 is a schematic of one embodiment of the invention operating in standard mode.

The present invention includes a spiral wound module ("element") suitable for use in reverse osmosis (RO) and nanofiltration (NF). Such modules include one or more RO or NF membrane envelops and feed spacer sheets wound about a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both reverse osmosis (RO) and nanofiltration (NF).

This invention is particular suitable to water treatment assemblies designed for residential use, e.g. those have less than 2 $m^2$ and more preferably less 1 $m^2$ of membrane area. A preferred length for such modules is less than 0.5 m. A representative hyperfiltration module includes FilmTec's 1812 configuration (e.g. TW30-1812), which is nominally 1.8 inches (4.6 cm) in diameter and nominally 12 inches (30 cm) long.

Figure 2:
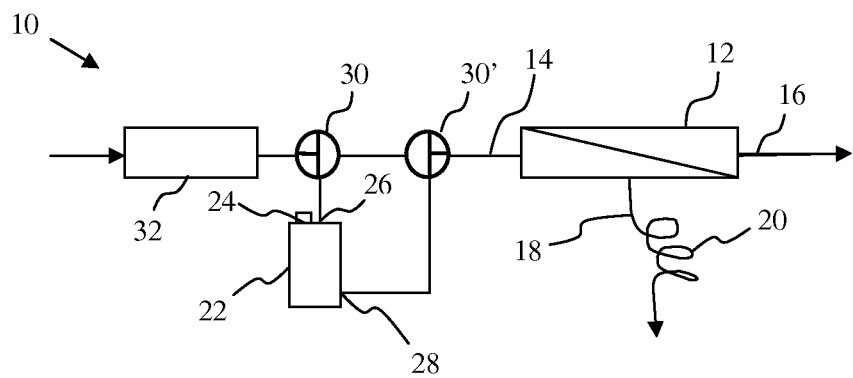
FIG. 2 is a schematic of the embodiment of FIG. 1 operating in testing or cleaning mode.

FIGS. 1 and 2 schematically illustrate an embodiment of the invention. The water treatment assembly (10) includes a spiral wound hyperfiltration membrane module (12) connected to a feed line (14) adapted for connection to a source of pressurized feed water (not shown). The source of feed water is not particularly limited and includes municipal or home drinking water supplies preferably provided at a pressure greater than 10 psi, and more preferably greater than 20 psi. (In many applications, feed pressure is preferably less than 100 psi or less than 60 psi.) The module (12) is also connected to a permeate line (16) adapted for connection to a dispenser of treated water (e.g. faucet, not shown), and a concentrate line (18) adapted for connection with drain or disposal storage vessel. The lines (14, 16, 18) may comprise traditional piping or hosing (e.g. copper, polyethylene, PVC, etc.) with connectors as conventionally used for such applications, e.g. as commonly used in residential home RO treatment systems. Alternative materials may be required for systems designed for operating under higher pressures. The spiral wound module (12) may be encapsulated within a shell or fitted within a housing with fluid inlets and outlet for connection with lines (14, 16, 18) as is common in the art. While only a single module (12) is required, multiple modules may be serially linked within a common housing or pressure vessel as is common in the art.

In a preferred set of embodiments, the assembly (10) is suitable to provide more than 40% recovery. Towards this end, the concentrate line (18) may include a flow restrictor (20) that limits feed flow and preferably the flow restrictor (20) and module (12) are selected to provide a recovery greater than 40% when the module (12) is operated at 20 gfd with 500 ppm $NaHCO_3$, at 25° C. and pH 8. In some embodiments, the flow restrictor (20) and module (12) may be selected to provide more than 50%, 60%, or even 70% recovery when the module (12) is operated at 20 gfd with 500 ppm $NaHCO_3$ at 25° C. and a pH 8. In such high recovery operations with more typical waters (e.g. containing calcium and bicarbonate ions), scale formation in the flow restrictor (20) has potential to cause unstable operation. Thus in preferred embodiments, the restrictor may be a tube of at least 0.5 m, preferably 1 m, in length having a minimum diameter of at least 1 mm.

The assembly (10) further includes a pressurizable reservoir (22) comprising a re-sealable opening (24) by which an additive may be introduced into the reservoir. In one embodiment, the additive is a cleaning agent, such as a biocide, detergent or acid, e.g. acetic acid. In another embodiment, the additive is a challenge species (e.g. a solution containing a challenge species that is detectable in the concentrate or permeate). The reservoir (22) includes an inlet (26) and an outlet (28) for pressurized feed water. Valves (30, 30') are included for selectively diverting flow of pressurized feed water along the feed line (14), to a path through the reservoir (22) between the inlet (26) and outlet (28), and returning to the feed line (14) prior to passing through the hyperfiltration membrane module (12). That is, the reservoir (22) and valves (30, 30') are located upstream from the module (12). The reservoir (22) may further be connected to a pump or bladder that provides a source of pressure to assist in the fluid flow, but in a preferred embodiment, the reservoir is passive and relies entirely on the pressure of the feed liquid flowing through feed line (14) from the source of pressurized feed water. The reservoir (22) may be detachable by the user from the assembly (10) to assist with re-filling. More preferably, the reservoir (20) is connected to drain through a valve (31). The drain connection may be through the inlet (26) or outlet (28). The re-sealable opening (24) is preferably on the top of the reservoir, and it may be located within a wider trough that facilitates poring an additive solution into the reservoir. Either the inlet (26) or outlet (28) for pressurized feed may be co-located with re-sealable opening (24). In preferred embodiments, the path (27) through the pressurizable reservoir (22) has a shortest length between inlet (26) and outlet (28) that exceeds five times, or even ten times, its largest open diameter. In this way, mixing is decreased and plug flow may be approximated.

When operating in standard mode as shown in FIG. 1, valves (30, 30') are actuated to bypass the reservoir such that feed water flows along feed line (14) directly to the module (12) where the feed generates a permeate and concentrate stream which exit the module via lines (16,18) respectively. When operating in cleaning mode as shown in FIG. 2, valves (30, 30') are actuated to direct the flow of feed water through the reservoir (22) where its contents may be entrained and intermix with feed liquid before flowing to the module. The valves (30, 30') may be manually actuated or may be controlled by a control circuit (not shown) which may be programmed to operate the valves (30, 30') in cleaning mode based upon a variety of criteria, i.e. time of day, volume of water treated, pressure drop across the module, etc.

Figure 3:
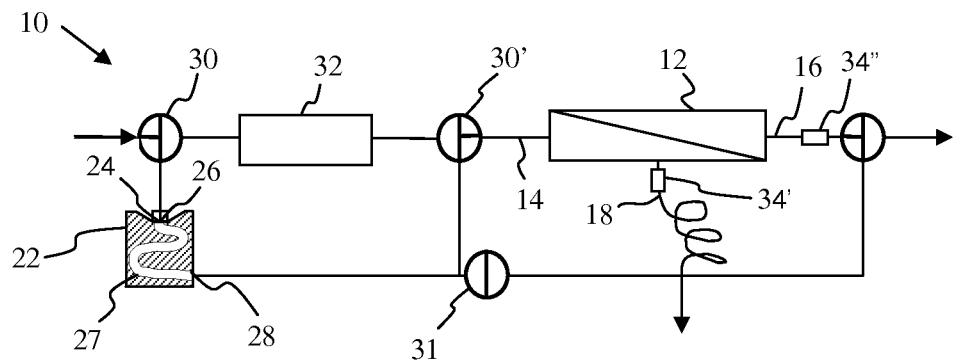
FIG. 3 is a schematic of an alternative embodiment of the invention.

In a preferred embodiment, the reservoir (22) is filled with vinegar as a convenient household source of acetic acid which is effective at mitigating scaling of the membrane. Other acids may also be used along with various detergents, biocides and other cleaning agents. Sensors (34', 34") may be positioned along the assembly to provide feedback to the control unit as part of a routine for actuating the valves (30, 30'). In a preferred embodiment, the cleaning agent is allowed to flow from the reservoir (22) to the module (12) where it is held for a period of time (e.g. several minutes to several hours) prior to exiting the module (12). This is best accomplished by activating a cleaning mode cycle while the assembly is inactive, e.g. during the evening when drinking water consumption is in low demand. A sensor (34') in the concentrate line (18) responding to the cleaning agent may assist in identifying an appropriate amount of time for feed flow through the reservoir such that the cleaning agent fills the module (12) before stopping to soak and/or an appropriate amount of time for flushing the cleaning agent from the module (12). For instance, the presence of acids (e.g. acetic acid) leaving the module may be detected by increased conductivity or decreased pH in the concentrate line (18). Even well-rejected acids can pass into the permeate when the system is stopped for a prolonged time. Thus, a sensor (34") may be located in the permeate line to ensure sufficient flushing of the permeate line prior to further production of potable water (see for example FIG. 3).

In another embodiment, the reservoir (22) is filled with a challenge species that is detectable by a sensor (34") located in contact with the permeate, (see FIG. 3) and the integrity of the assembly may be verified by directing contents of the reservoir through the module under pressure. For example, a conductive sensor may detect passage of well-rejected salts though defects in the module. In this case, the challenge species may be a salt (e.g. $MgSO_4$) that is at least 99% rejected, preferably 99.9% rejected, by a defect-free module when operated at 20 gfd (34 l/m$^2$/hr). In yet another embodiment, the challenge species may be detectable by a light sensor (34") located in the permeate line (16), and measurements may include light absorption, turbidity, or particle monitoring/counting. In this case, example challenge species may include latex and particles greater than 0.1 microns. The challenge species may also be one that absorbs light strongly (e.g. a molecule having an extinction coefficient greater than $10^4$ $M^{-1}$ $cm^{-1}$, more preferably greater than $10^5$ $M^{-1}$ $cm^-$). Preferably, the species is large (>500 amu or even >700 amu) so that it does not pass through the membrane well. Preferably the species is an ion with multiple negative charges at pH 8. Examples of preferred species include Brilliant Blue FCF, Fast Green FCF, Ponceau 4R, and Erythrosine. Other dyes that may be used as a challenge species include anionic dyes that are permitted as food additives in the United States or Europe. A variety of other challenge species and corresponding sensors may also be used, including magnetic and fluorescent species. See for example WO 2001/085295A2, U.S. Pat. No. 7,698,928, and US 2011/0281960.

To use the reservoir volume efficiently, it is preferred that the module has low total feed spacer free volume. Preferably the feed spacer volume is less than 0.2, 0.15, or even less than 0.1 liter per square meter of membrane. One way this may be accomplished is by use of a thin feed spacer. Alternatively or in addition, a module with low feed spacer volume may be obtained by using a bi-directional net with increased thickness or number of strands per inch in one or both directions. Such spacers may be constructed by methods known in the art (e.g. U.S. Pat. Nos. 4,861,487A, 6,881,336B2, 7,459,082B2, 8,361,318B2). A high permeability (A-value) of the membrane can also contribute to limiting the amount of feed spacer area required for the desired module flow rate. Membrane used in the FILMTEC TW30-1812-100 module is among the highest permeability commercial reverse osmosis membranes (A-value ~0.4 gfd/psi). However, treatment of this membrane with chlorine, as described in U.S. Pat. Nos. 5,876,602 and 6,171,497 can substantially increase its flow, resulting in A-values greater than 0.55 gfd/psi (13.5 L/m$^2$/hr/bar). In a preferred embodiment, the ratio of feed spacer thickness to membrane A-value is less than 60 bar sec. Unfortunately, even when lowering pressure to operate at conventional fluxes, high permeability membranes can increase scaling potential by causing uneven flow distribution into the permeate spacer, with more flux at near the permeate tube. In one embodiment, the permeate spacer has greater thickness than the feed spacer, in contrast to conventional designs. For instance, a 12 mil (0.30 mm) permeate Tricot material may be used in combination with a 10 mil (0.25 mm) thick feed spacer net.

As shown in the figures, the assembly (10) may optionally include an adsorbent-containing unit (32) located upstream from the spiral wound membrane module (12). The adsorbent-containing unit (32) preferably comprises a canister of activated carbon. The assembly (10) is designed such that the additive released from the reservoir is downstream or otherwise bypasses the adsorbent-containing unit (32). For example, in the embodiment of FIGS. 1 and 2, the reservoir (22) is located downstream from the adsorbent-containing unit (32) such that the additive of the reservoir (22) is unable to flow through the unit (32). In the alternative embodiment of FIG. 3, valve (30) is located upstream from the adsorbent-containing unit (32) while valve (30') is located downstream (but upstream from the module (12)) such that feed water bypasses the adsorbent-containing unit (32) during the cleaning or testing mode. The subject assembly is particularly suited for residential applications that exclude pumps and which rely solely upon pressure of an in-line tap water source (e.g. from 10 to 60 psi). Alternatively, or additionally, the assembly may exclude any tanks for storing permeate. In such applications, the assembly may be mounted under-the-sink for treating drinking water or used in connection with appliances such as ice makers and dishwashers. In other embodiments, the assembly optionally includes one or more pumps or additional treatment units, e.g. a microfiltration cartridge located upstream from the spiral wound membrane element, or a downstream UV-sterilizer.

Many embodiments of the invention have been described and in some instances certain embodiments, selections, ranges, constituents, or other features have been characterized as being "preferred." Such designations of "preferred" features should in no way be interpreted as an essential or critical aspect of the invention. While a preferred assembly includes a single spiral wound module, it will be appreciated that an assembly may also include more than one spiral wound module. The entire content of each of the aforementioned patents and patent applications are incorporated herein by reference.

The invention claimed is:

1. A water treatment assembly comprising a spiral wound hyperfiltration membrane module connected to:
   i) a feed line adapted for connection to a source of pressurized feed water,
   ii) a permeate line adapted for connection to a dispenser of treated water and
   iii) a concentrate line adapted for connection with a drain and including a flow restrictor wherein the flow restrictor and spiral wound hyperfiltration membrane module are selected to provide more than 50% recovery when operated at 20 gfd with 500 ppm NaHCO$_3$ at 25° C. and a pH 8; and
   iv) a pressurizable reservoir including valves for selectively diverting flow along the feed line, through the pressurizable reservoir and returning to the feed line prior to passing through the spiral wound hyperfiltration membrane module; and wherein the pressurizable reservoir comprises:
      a) re-sealable opening by which an additive may be introduced,
      b) an inlet and an outlet for pressurized feed water, and
      c) a path through the pressurizable reservoir that has a length between the inlet and the outlet, and wherein the length exceeds five times the path's largest open diameter.

2. The assembly of claim 1 wherein the length between the inlet and the outlet exceeds ten times the largest open diameter of the pressurizable reservoir.

3. The assembly of claim 1 wherein the pressurizable reservoir contains a cleaning agent that is an acid.

4. The assembly of claim 3 wherein the pressurizable reservoir contains vinegar.

5. The assembly of claim 1 wherein the flow restrictor is a tube of at least 0.5 m in length having a minimum diameter of at least 1 mm.

6. The assembly of claim 1 further comprising a conductivity sensor located along the concentrate line adapted to detect a change in conductivity.

7. The assembly of claim 1 further characterized by excluding pumps and storage tanks for storing treated water.

* * * * *